US012488116B2

(12) United States Patent
Inbar

(10) Patent No.: US 12,488,116 B2
(45) Date of Patent: Dec. 2, 2025

(54) SYSTEMS AND METHODS FOR DETECTING ABNORMAL PERMISSIONS IN A CLOUD ENVIRONMENT

(71) Applicant: Zscaler, Inc., San Jose, CA (US)

(72) Inventor: Roi Inbar, Tel Aviv (IL)

(73) Assignee: Zscaler, Inc., San Jose, CA (US)

( * ) Notice: Subject to any disclaimer, the term of this patent is extended or adjusted under 35 U.S.C. 154(b) by 141 days.

(21) Appl. No.: 18/509,936

(22) Filed: Nov. 15, 2023

(65) Prior Publication Data

US 2025/0156553 A1 May 15, 2025

(51) Int. Cl.
*G06F 21/60* (2013.01)
*G06F 9/50* (2006.01)
*G06F 21/57* (2013.01)
*H04L 9/40* (2022.01)
*H04L 43/045* (2022.01)
*H04L 67/50* (2022.01)

(52) U.S. Cl.
CPC .......... *G06F 21/577* (2013.01); *G06F 9/5072* (2013.01); *G06F 21/604* (2013.01); *G06F 2221/2141* (2013.01); *H04L 43/045* (2013.01); *H04L 63/20* (2013.01); *H04L 67/535* (2022.05)

(58) Field of Classification Search
CPC ... H04L 63/1425; H04L 63/20; H04L 63/104; H04L 43/045; H04L 67/535; G06F 11/327; G06F 11/3452
See application file for complete search history.

(56) References Cited

U.S. PATENT DOCUMENTS

| 2010/0250726 A1 | 9/2010 | Moses et al. | |
| 2022/0086162 A1* | 3/2022 | Badawy | H04L 63/105 |
| 2022/0086256 A1* | 3/2022 | Stram | H04L 67/535 |

* cited by examiner

*Primary Examiner* — Tom Y Chang
(74) *Attorney, Agent, or Firm* — Baratta Law PLLC; Lawrence A. Baratta, Jr.; Ryan Odessa

(57) ABSTRACT

Systems and methods for detecting abnormal permissions in a cloud environment include obtaining data associated with a cloud environment; partitioning the data into a plurality of groups and windows, wherein each of the windows includes one or more groups; determining one or more groups within a window having a similarity; and identifying one or more groups as having abnormal permissions based on the similarity. Based on a similarity score being above a threshold, the systems can be adapted to identify the differences, i.e., the one or more extra permissions in one of the groups, and automatically remove these permissions.

20 Claims, 8 Drawing Sheets

SYSTEMS AND METHODS FOR DETECTING ABNORMAL PERMISSIONS IN A CLOUD ENVIRONMENT

FIELD OF THE DISCLOSURE

The present disclosure generally relates to computer networking systems and methods. More particularly, the present disclosure relates to systems and methods for detecting abnormal permissions in a cloud environment.

BACKGROUND OF THE DISCLOSURE

The traditional view of an enterprise network (i.e., corporate, private, etc.) included a well-defined perimeter defended by various appliances (e.g., firewalls, intrusion prevention, advanced threat detection, etc.). In this traditional view, Information Technology (IT) had complete control of applications, services, and resources located within the well-defined perimeter. However, this is no longer the case—the definition of the workplace is no longer confined to within the well-defined perimeter, and with applications moving to the cloud, the perimeter has extended to the Internet. This results in an increased risk for the enterprise data residing on unsecured and unmanaged devices as well as the security risks in access to the Internet.

The trend of applications moving to the cloud continues and each enterprise user can have dozens of more accounts for cloud applications. For example, an enterprise user may have a need for access to a specific cloud application for a singular purpose. The user may perform this purpose and not need the access any further. In practice, there can be millions of accounts for enterprise users of tens or hundreds of different cloud applications. The typical approach to account management is to remove unused or unconsumed permissions. For example, lock or delete accounts where users have not logged in for a certain period of time. However, this can lead to unnecessary churn and poor user experience where users access applications occasionally. Further, due to the sheer number of user accounts, it is impractical to manage each account individually.

BRIEF SUMMARY OF THE DISCLOSURE

The present disclosure relates to systems and methods for detecting abnormal permissions in a cloud environment. The present disclosure can include a method including steps, a server configured to implement the steps, and a non-transitory computer-readable medium with instructions that cause processors to implement the steps. The steps include obtaining data associated with a cloud environment; partitioning the data into a plurality of groups and windows, wherein each of the windows includes one or more groups; determining one or more groups within a window having a similarity; and identifying one or more groups as having abnormal permissions based on the similarity.

The steps can further include wherein the data includes users of the cloud environment, resources in the cloud environment, and permissions of each of the users in relation to the resources in the cloud environment. The partitioning can include partitioning users of the cloud environment into groups and windows based on a number of permissions associated with each user of the cloud environment. Each group can include one or more users, wherein each of the one or more users has one or more permissions to resources in the cloud environment. The determining can include performing a similarity calculation to determine a similarity between groups in a window. The similarity calculation can be an asymmetrical similarity calculation performed between each group associated with a window to produce a similarity score. The identifying one or more users as having abnormal permissions can be based on the similarity score being above a predefined threshold. The steps can further include performing one or more actions based on the identifying. The one or more actions can include any of removing an abnormal permission and providing the one or more groups having abnormal permissions to administrators for further analysis. The providing can further include providing data associated with one or more peer groups of the one or more groups having abnormal permissions to administrators for further analysis.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a block diagram of a user device, which may be used with the cloud-based system or the like.

DETAILED DESCRIPTION OF THE DISCLOSURE

The present disclosure relates to systems and methods for detecting abnormal permissions in a cloud environment. By utilizing the present systems and methods to optimize permission mutation calculations in cloud environments, the runtime and memory usage of cloud resources can be greatly reduced. Once similarity scores are calculated, a threshold can be used to filter the output. That is, a user or group can be identified as including an abnormal permission based on its similarity score with another group being above this predetermined threshold. This is then exported as a finding of the model which can then be used to perform one or more actions, such as removing an abnormal permission, providing the findings to administrators for further analysis, and the like. Based on the similarity score being above the threshold, the systems can be adapted to identify the differences, i.e., the one or more extra permissions in one of the groups, and automatically remove these permissions. Because each calculation is performed on the various windows and not on an entire data set including all users, permissions, and resources in an environment, the present systems and methods provide a much more efficient way to detect abnormal permissions.

Example Cloud-Based System Architecture

Figure 1:
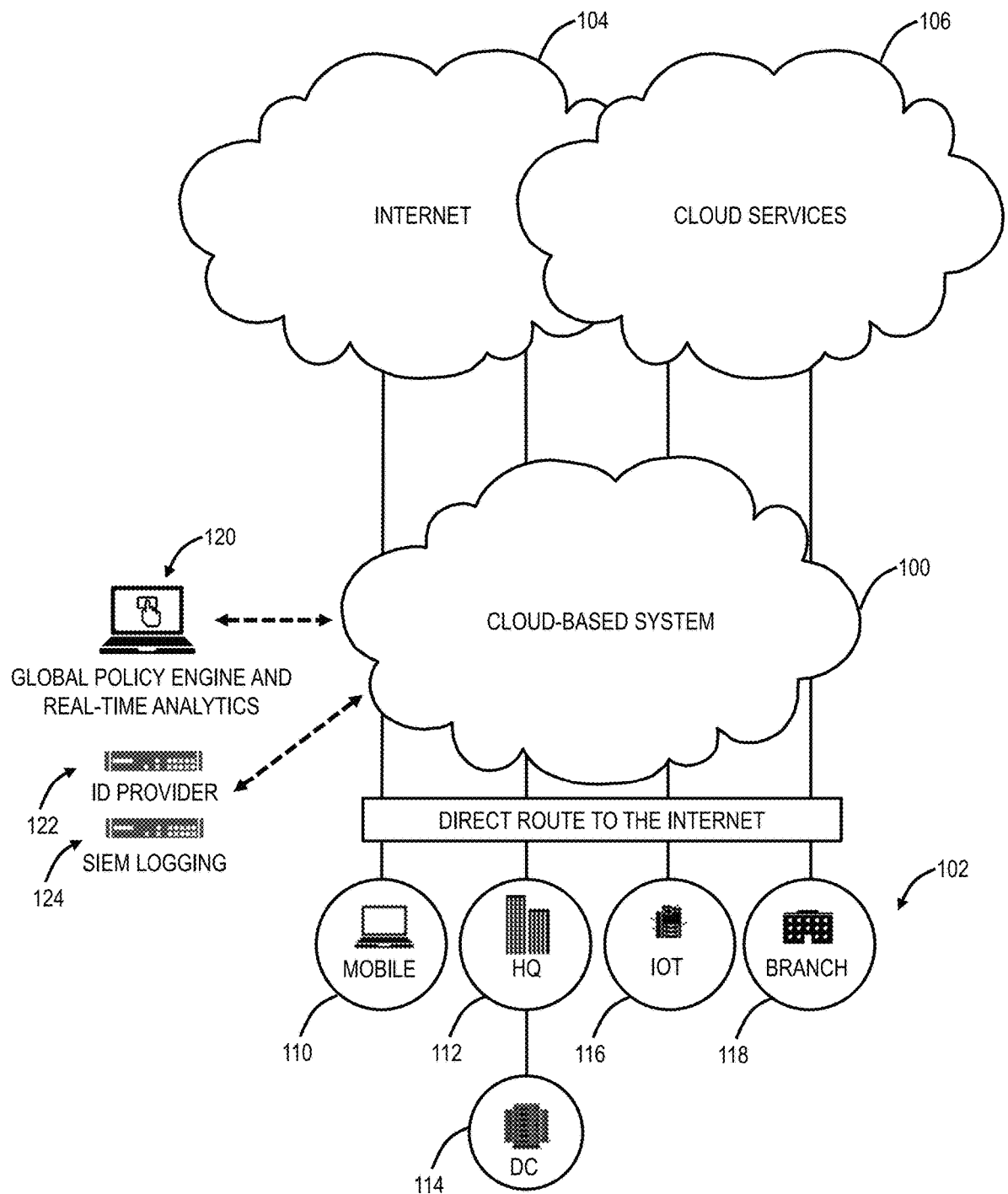
FIG. 1 is a network diagram of a cloud-based system offering security as a service.

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
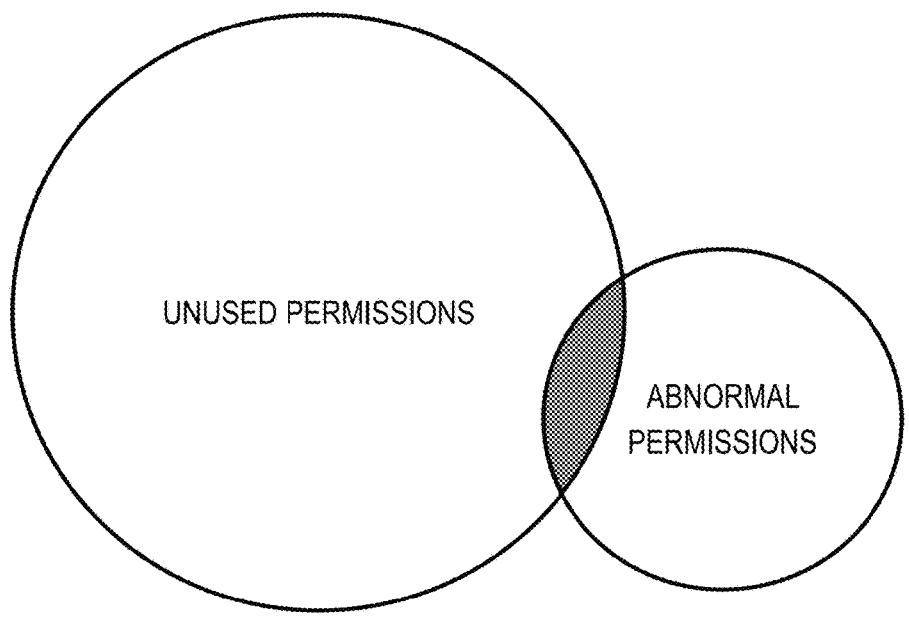
FIG. 5 is a Venn diagram illustrating the relationship between unused permissions and abnormal permissions.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes-they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
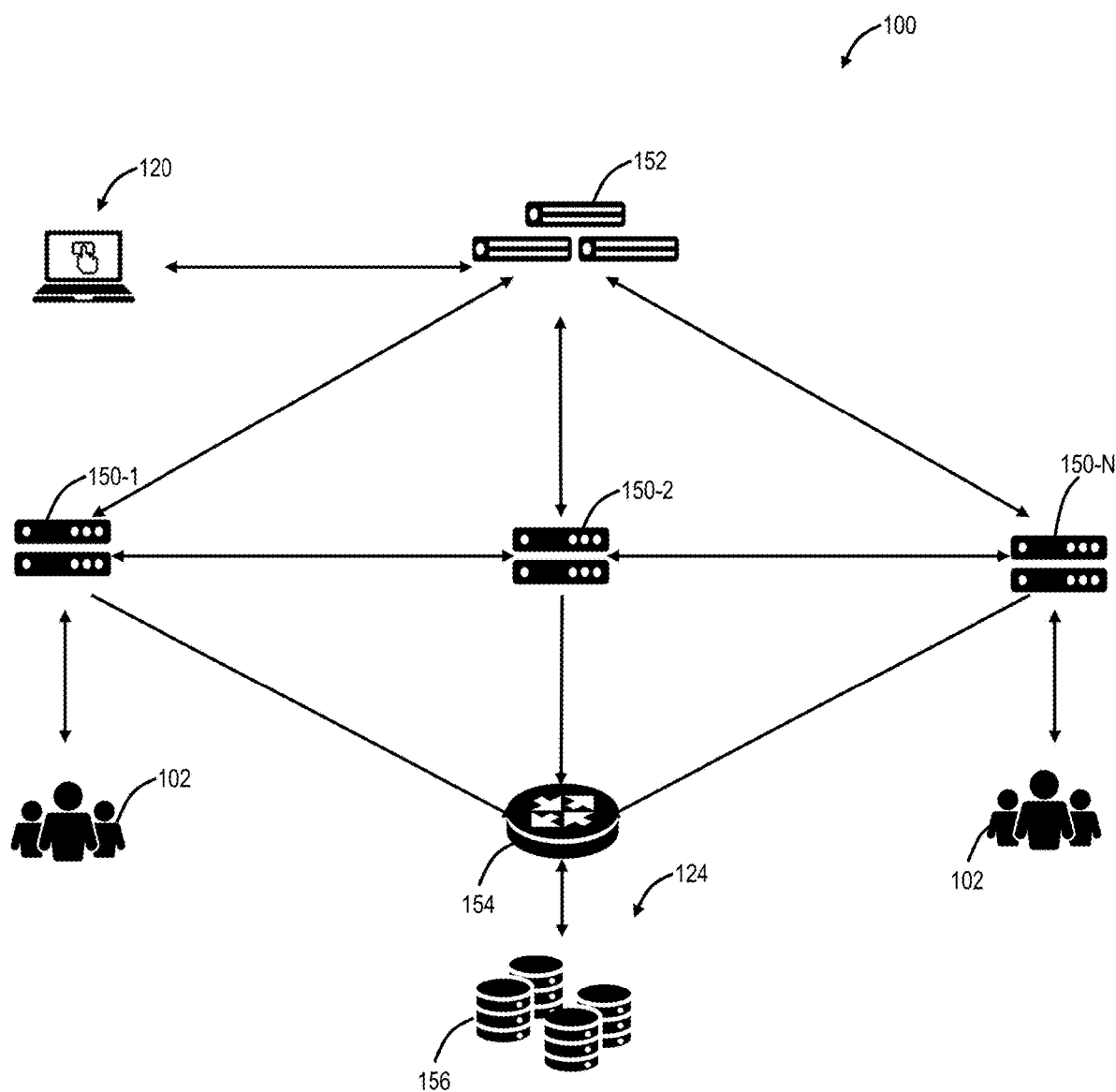
FIG. 2 is a network diagram of an example implementation of the cloud-based system.
Figure 4:
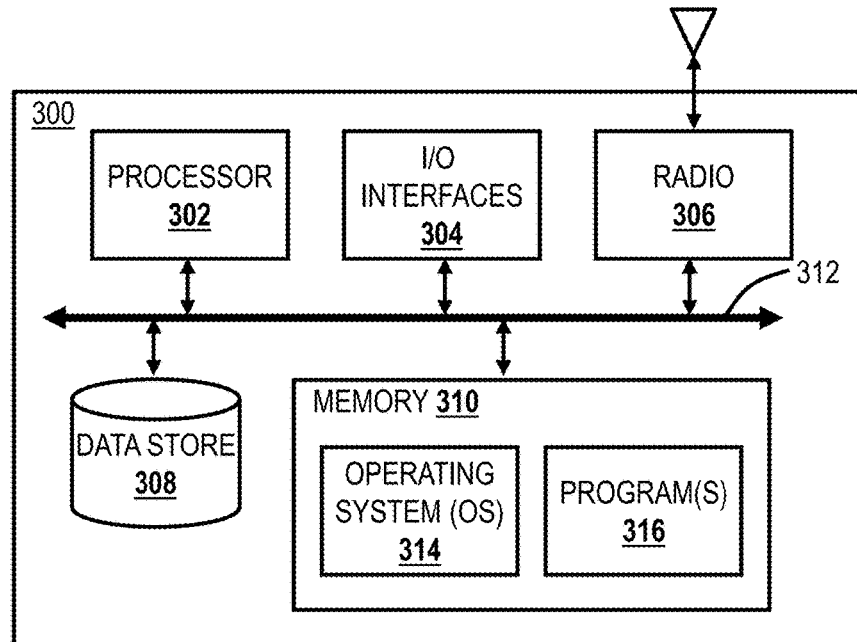

FIG. 2 is a network diagram of an example implementation of the cloud-based system 100. In an embodiment, the cloud-based system 100 includes a plurality of nodes 150, labeled as nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the nodes 150. The central authority 152 provide centralized policy, real-time threat updates, etc. and coordinates the distribution of this data between the nodes 150. The nodes 150 provide an onramp to the users 102 and are configured to execute policy, based on the central authority 152, for each user 102. The nodes 150 can be geographically distributed, and the policy for each user 102 follows that user 102 as he or she connects to the nearest (or other criteria) node 150.

Of note, the cloud-based system 100 is an external system meaning it is separate from tenant's private networks (enterprise networks) as well as from networks associated with the devices 110, 116, and locations 112, 118. Also, of note, the present disclosure describes a private node 150P that is both part of the cloud-based system 100 and part of a private network. Further, the term nodes as used herein with respect to the cloud-based system 100 can be one or more servers, including physical servers, virtual machines (VM) executed on physical hardware, appliances, custom hardware, compute resources, clusters, etc., as described above, i.e., the nodes 150 contemplate any physical implementation of computer resources. In some embodiments, the nodes 150 can be Secure Web Gateways (SWGs), proxies, Secure Access Service Edge (SASE), etc.

The nodes 150 are full-featured secure internet gateways that provide integrated internet security. They inspect all web traffic bi-directionally for malware and enforce security, compliance, and firewall policies, as described herein, as well as various additional functionality. In an embodiment, each node 150 has two main modules for inspecting traffic and applying policies: a web module and a firewall module. The nodes 150 are deployed around the world and can handle hundreds of thousands of concurrent users with millions of concurrent sessions. Because of this, regardless of where the users 102 are, they can access the Internet 104 from any device, and the nodes 150 protect the traffic and apply corporate policies. The nodes 150 can implement various inspection engines therein, and optionally, send sandboxing to another system. The nodes 150 include significant fault tolerance capabilities, such as deployment in active-active mode to ensure availability and redundancy as well as continuous monitoring.

In an embodiment, customer traffic is not passed to any other component within the cloud-based system 100, and the nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the nodes 150. In another embodiment, specific data specified by each tenant, e.g., only email, only executable files, etc., is processed through one of the nodes 150.

Each of the nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the node 150 may allow the distribution of the content item, preclude distribution of the content item, allow distribution of the content item after a cleaning process, or perform threat detection on the content item. In an embodiment, the actions taken by one of the nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The nodes 150 establish persistent connections to the central authority 152 to download all policy configurations. When a new user connects to a node 150, a policy request is sent to the central authority 152 through this connection. The central authority 152 then calculates the policies that apply to that user 102 and sends the policy to the node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the nodes 150 request the new policy when the user 102 next makes a request. In an embodiment, the node 150 exchange "heartbeats" periodically, so all nodes 150 are informed when there is a policy change. Any node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Other examples of cloud applications can include, for example, Amazon Web Services (AWS), Microsoft Azure, Google Cloud, Salesforce, Box, Dropbox, and the like.

Example Server Architecture

Figure 3:
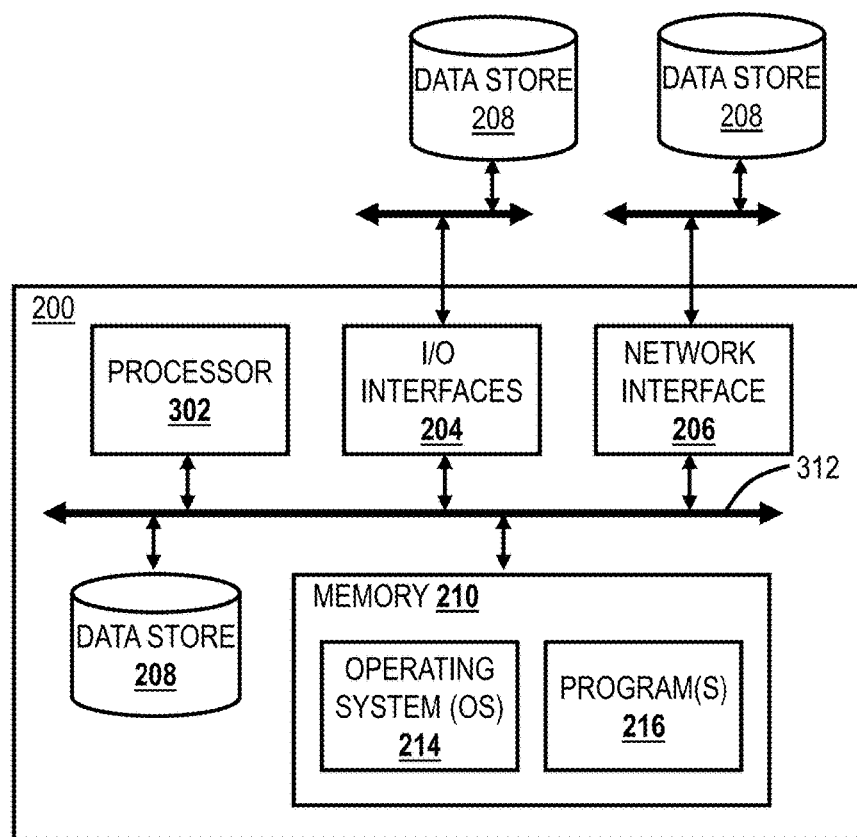
FIG. 3 is a block diagram of a server, which may be used in the cloud-based system, in other systems, or standalone.

FIG. 3 is a block diagram of a server 200, which may be used in the cloud-based system 100, in other systems, or standalone. For example, the nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

DEFINITIONS

The following are definitions used herein.

A user account provides the ability to use a cloud application for a specific user at some privilege level. The user account can include credentials, e.g., login ID and password. The term user account can be used along with assignment, permission, etc. The users 102 are associated with a tenant and can each have some mechanism to differentiate between users, such as, e.g., job functions, title, group or department, location, etc. Also, the user account can be a specific machine, i.e., user device 300.

An unused user account is one where the underlying user has not logged in for a certain period of time. This can also be referred to as unconsumed permissions, assignments, etc.

An abnormal user account is one where the underlying user has a set of permissions that are anomalous compared to similar users.

Permissions define a scope of a user account in the given cloud application. The term attributes can also be used interchangeably with permissions.

FIG. 5 is a Venn diagram illustrating the relationship between unused permissions and abnormal permissions. Specifically, the present disclosure contemplates identifying and remediating user accounts that are both unused and abnormal. Unused user accounts can be identified as is known in the art, namely a user has not accessed the account in a given period of time. Abnormal user accounts are identified via a genetic algorithm described as follows. Where a typical manual account has hundreds of thousands of different permissions to cloud resources, it is not likely for the account to access all resources frequently. The intersection of abnormal and unused permissions suggests an untypical security approach to an individual user that may put the organization in much higher risk than infrequent used resources.

Dimension-Based Communities

A dimension-based community of accounts in a given cloud application is defined as a group of users (and/or machines) which have the exact (or, nearly exact) set of attributes in one (or more) of a given dimension. The dimensions can include 1) assignments, 2) entitlements, 3) behavior attributes, and 4) meta attributes.

The assignments can be a unique key for a permission on a resource/group of resources, e.g., unique policies on unique resources.

The entitlements are actions that a user can perform on a given resource, e.g., the permission to perform a given action on a given unique resource.

The behavior attributes can include performing a resource action with a given frequency.

The meta attributes can differentiate users, such as department, domain email, manager, etc.

Figure 6:
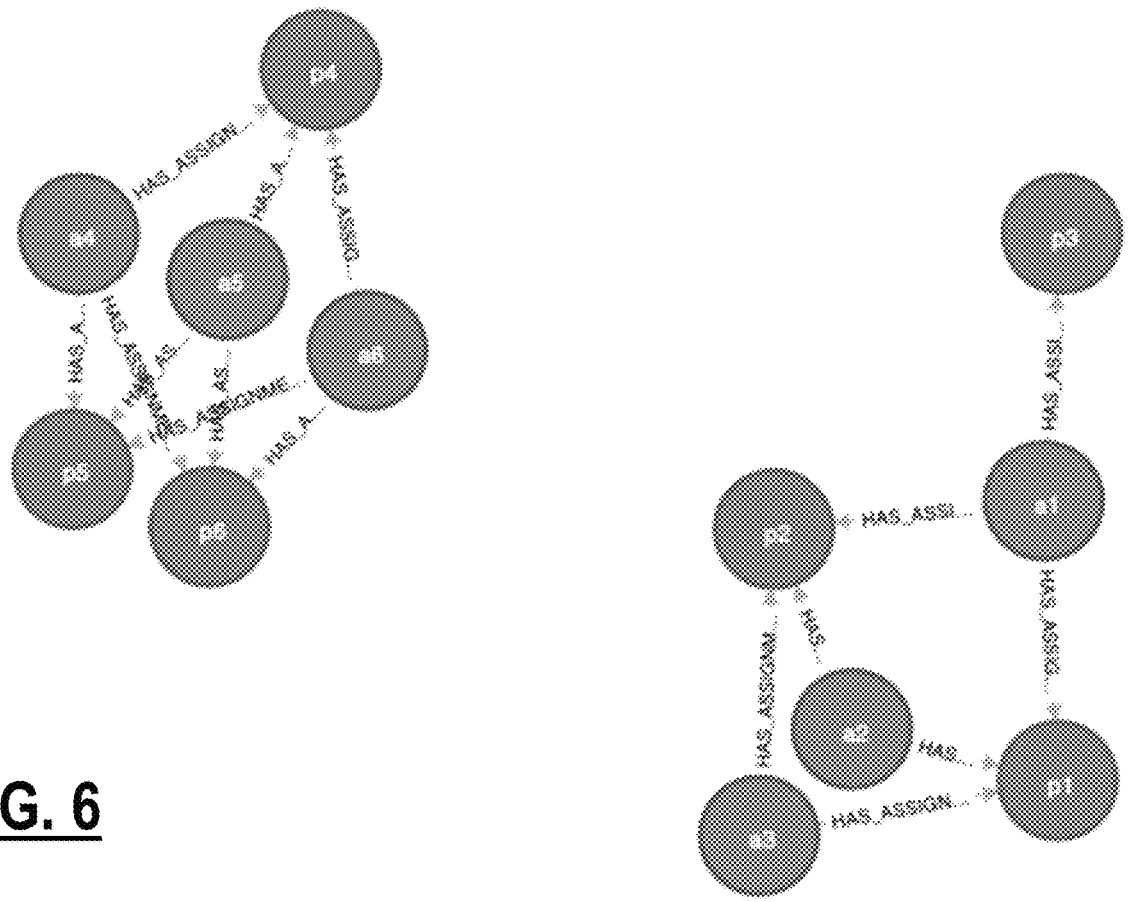
FIG. 6 is an example of a bipartite graph of user accounts and assignments.

These can all be referred to as dimensions. The present disclosure includes each dimension reflecting a bipartite graph. FIG. 6 is an example of a bipartite graph of user accounts and assignments. For ease of illustration, accounts are listed as a1-a6 and assignments are listed as p1-p6. Note, a practical example can have many more user accounts and assignments including different types. Also, for simplicity, assume that all relationships 'Has Assignments' are weighted the same.

For example, a use-case for assignment based communities:

Text Representation:

(a1) -[: HAS_ASSIGNMENT]→(p1),
(a2) -[: HAS_ASSIGNMENT]→(p1),
(a3) -[: HAS_ASSIGNMENT]→(p1),
(a1) -[: HAS_ASSIGNMENT]→(p2),
(a2) -[: HAS_ASSIGNMENT]→(p2),
(a3) -[: HAS_ASSIGNMENT]→(p2),
(a1) -[: HAS_ASSIGNMENT]→(p3),
(a4) -[: HAS_ASSIGNMENT]→(p4),
(a5) -[: HAS_ASSIGNMENT]→(p4),
(a6) -[: HAS_ASSIGNMENT]→(p4),
(a4) -[: HAS_ASSIGNMENT]→(p5),
(a5) -[: HAS_ASSIGNMENT]→(p5),
(a6) -[: HAS_ASSIGNMENT]→(p5),
(a4) -[: HAS_ASSIGNMENT]→(p6),
(a5) -[: HAS_ASSIGNMENT]→(p6),
(a6) -[: HAS_ASSIGNMENT]→(p6);

Dimension-Vector Aggregation

To aggregate the communities, shift the relationship to a bitmap row-based matrix, where, e.g., rows are the accounts, and columns are the assignments:

|    | p1 | p2 | p3 | p4 | p5 | p6 |
|----|----|----|----|----|----|----|
| a1 | 1  | 1  | 1  | 0  | 0  | 0  |
| a2 | 1  | 1  | 0  | 0  | 0  | 0  |
| a3 | 1  | 1  | 0  | 0  | 0  | 0  |
| a4 | 0  | 0  | 0  | 1  | 1  | 1  |
| a5 | 0  | 0  | 0  | 1  | 1  | 1  |
| a6 | 0  | 0  | 0  | 1  | 1  | 1  |

Row Ri is identified as the assignment (or: dimension) DNA for account ai. For simplicity, all weights are the same (=1) in this matrix, but this does not necessarily need to be the case. Also, given domain knowledge, this is destined to be a sparse matrix.

In this example, there are three assignment-based communities:

| Index | Users     | Assignment Set |
|-------|-----------|----------------|
| 0     | a1        | p1, p2, p3     |
| 1     | a2, a3    | p1, p2         |
| 2     | a4, a5, a6| p4, p5, p6     |

For attributes, every account belongs to exactly one community. The assignment set combination is unique per community, but overlapping may occur. For example: p1, p2 belongs to both community 0 and community 1, but each assignment set combination is unique.

Relational Weight

After calculating the assignments communities, a connectivity rank (CR) is assigned to each assignment. The CR reflects the likelihood of two randomly selected accounts with the given assignment yield the same community ID (conditional probability).

$$CR(p_i) = P(\alpha_i \cdot community == \alpha_j \cdot community | \alpha_i(p_i) == 1 \wedge \alpha_j(p_i) == 1)$$

In the example above, $$CR(p_1) = \frac{\binom{2}{2} + \binom{2}{1}}{\binom{2}{3}} = \frac{1}{3}$$

$$CR(p_2) = \frac{\binom{2}{2} + \binom{2}{1}}{\binom{2}{3}} = \frac{1}{3}$$

$$CR(p_3) = \frac{\binom{2}{1}}{\binom{2}{1}} := 1$$

$$CR(p_4) = \frac{\binom{2}{3}}{\binom{2}{3}} := 1$$

$$CR(p_5) = \frac{\binom{2}{3}}{\binom{2}{3}} := 1$$

$$CR(p_6) = \frac{\binom{2}{3}}{\binom{2}{3}} := 1$$

The weight of assignment $p_i$ is defined as a linear transformation of the connectivity rank, and tuned as a hyper parameter per customer.

All weights meet the definition of

For the trivial case $\alpha=0 \wedge \beta=1$, the weight for all $p_i$ is 1.

For the case $\alpha=1 \wedge \beta=0$, the weight for $p_i$ is exactly the same as the connectivity rank (CR).

The adjusted bit map per community is now:

| Index | Users      | Assignment Set | p1  | p2  | p3 | p4 | p5 | p6 |
|-------|------------|----------------|-----|-----|----|----|----|----|
| 0     | a1         | p1, p2, p3     | 1/3 | 1/3 | 1  | 0  | 0  | 0  |
| 1     | a2, a3     | p1, p2         | 1/3 | 1/3 | 0  | 0  | 0  | 0  |
| 2     | a4, a5, a6 | p4, p5, p6     | 0   | 0   | 0  | 1  | 1  | 1  |

Directed Community Distance

The next step is to calculate the (asymmetric) distance among communities. The distance can include 1) Weight of assignments, 2) Tversky index, and/or 3) Community degree.

The definition of distance is as follows:

$$dist(c_i, c_j) = \begin{cases} \dfrac{\sum_{c_i(p_i)>0} |p_i|}{\sum_{c_i(p_i)>0 \wedge c_j(p_j)>} |p_i|}, & users(c_i) \leq users(c_j) \\ \infty, & \text{Otherwise} \end{cases}$$

In words, given that community_i has less or equal users compared to community_j, the asymmetrical distance from community_i to community_j is the division of the summation of community_i assignments weights by summation of mutual assignments weights.

In the example, here is the matrix of all distance calculations:

| community index | 0 | 1 | 2 |
|---|---|---|---|
| 0 | 0 | 2.5 = dist(c0, c1) | 0 |
| 1 | ∞ | 0 | 0 |
| 2 | ∞ | ∞ | 0 |

By definition, a community i is considered at risk if:

That is, not 0 and smaller than infinity. The base community for the risk is the one with the lowest non-zero distance value. In the example, community 0 is at risk with the base community 1.

Sorting Risks

Next, a risk score can be assigned for every peer in a detected community at risk, e.g., 0 to 100. The score factors can include 1) Ratio of extra granted assignments to the community at risk over the base group,
2) Count of Assignments in both communities,
3) Permitted actions that are at risk (this is calculated per user)—log scaled For example, the score can be The tanh (hyperbolic tangent) is a function that values between [0,1]. Overall, this guarantees that the bottom risk score is always in range [0, 100].

Unused, Abnormal User Account Detection Process

Figure 7:
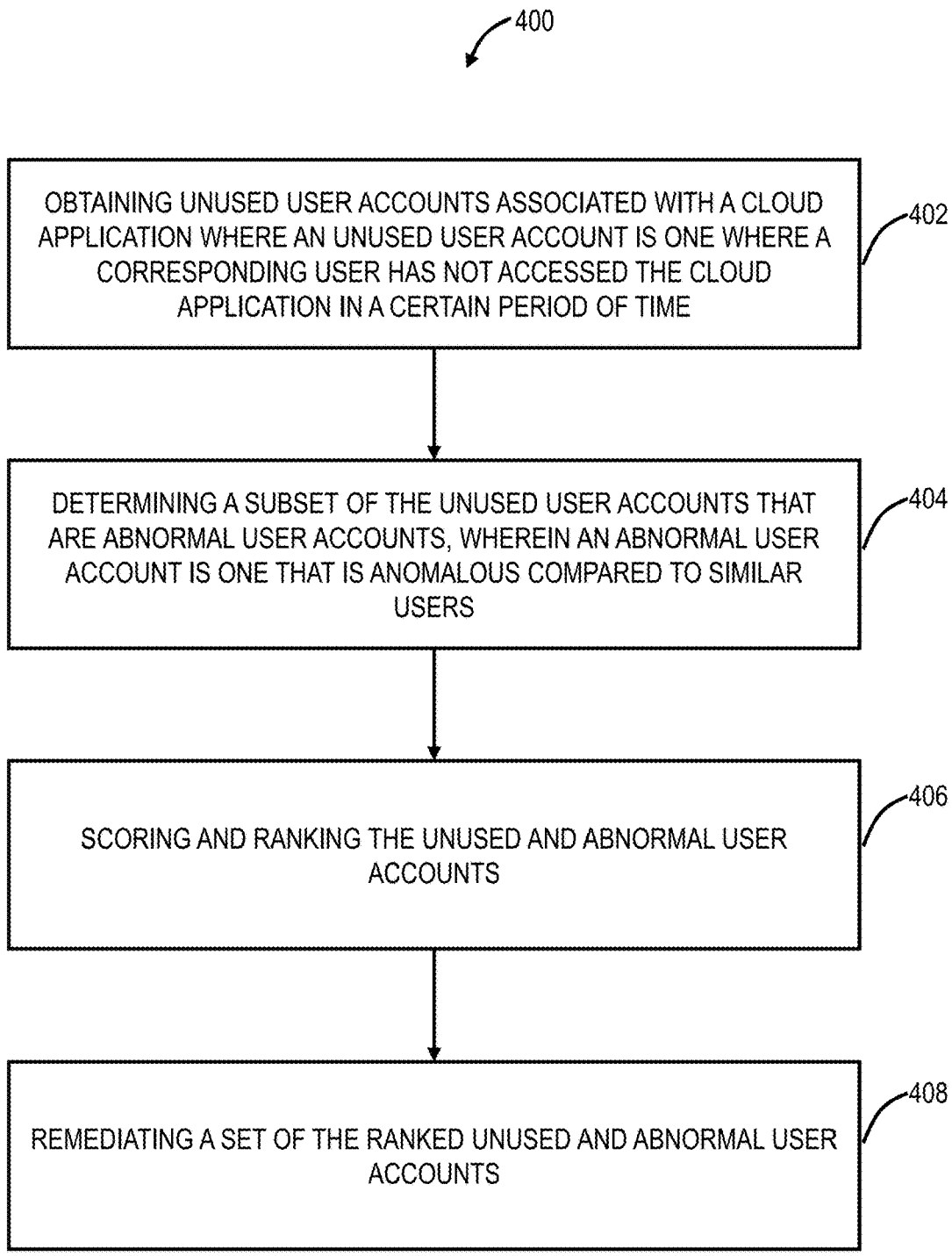
FIG. 7 is a flowchart of an unused, abnormal user account detection process.

FIG. 7 is a flowchart of an unused, abnormal user account detection process 400. The process 400 can be a computer-implemented method, implemented as instructions stored in a computer-readable medium and executed by one or more processors, or by an apparatus such as a node in the cloud-based system 100.

The process 400 includes obtaining unused user accounts associated with a cloud application where an unused user account is one where a corresponding user has not accessed the cloud application in a certain period of time (step 402); determining a subset of the unused user accounts that are abnormal user accounts, wherein an abnormal user account is one that is anomalous compared to similar users (step 404); scoring and ranking the unused and abnormal user accounts (step 406); and remediating a set of the ranked unused and abnormal user accounts (step 408).

The similar users are ones that have commonality in any of department, location, and job function, set of permissions, set of entitled resource actions, set of accessible assets etc., and wherein anomalous means a user has a close but different set of attributes as mentioned above corresponding similar users.

The abnormal user accounts are determined using a genetic algorithm. The genetic algorithm determines assignment based communities and determines a distance therebetween, with the abnormal user accounts being based on the distance. The genetic algorithm utilizes communities based on any of assignments, entitlements, behavior attributes, and meta attributes. The genetic algorithm utilizes a bipartite graph between users and assignments, converts the bipartite graph to a bitmap, determines communities based on the bitmap, computes a relational weight of each community, and computes distances among the community using the relational weight.

The scoring is based on a combination of extra granted assignments, assignment counts, and permitted actions.

Lightweight Cloud Permissions Mutation Detector

As cloud-based architectures become more popular, there is a need to provide a scalable, lightweight cloud permission detector to identify risky cloud permissions within cloud environments. Big data is difficult to manage manually, therefore the present systems and methods use genetic algorithms that map each of the account's permissions over their resources and detects accounts that have extra permissions which provide them higher-level roles. Similar users can be ones that have commonality in any of department, location, and job function, and wherein anomalous means a user has different permissions from corresponding similar users.

Figure 8:
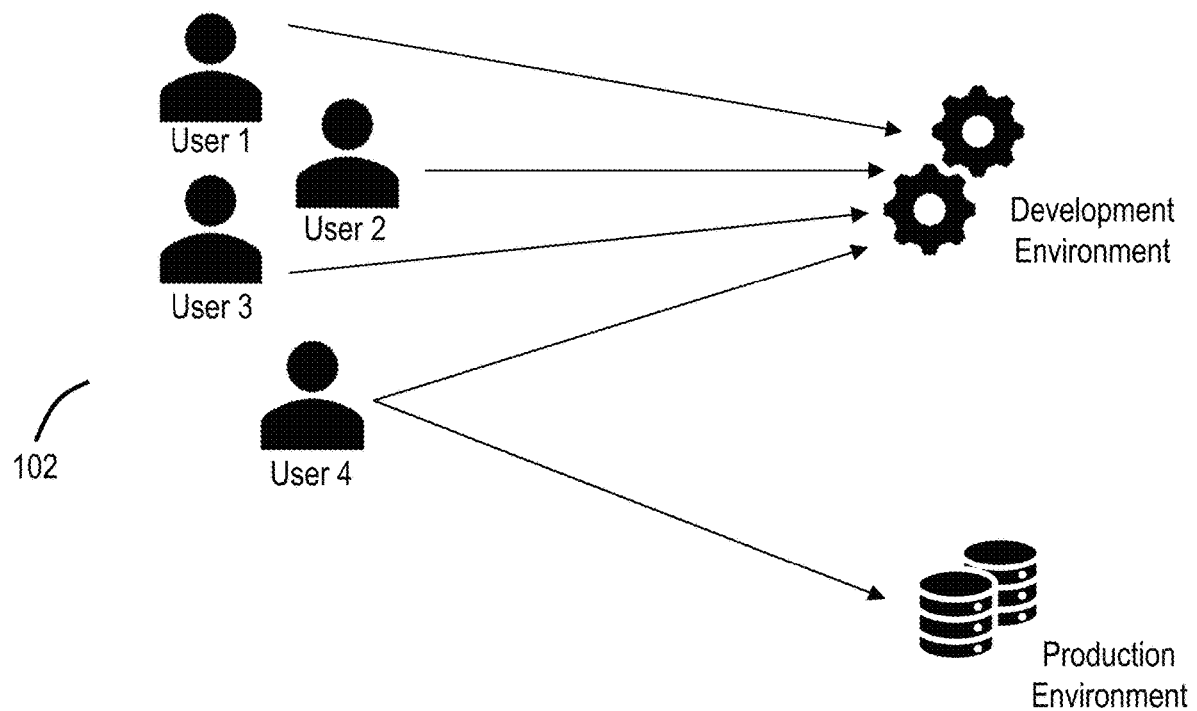
FIG. 8 is an example of a group of similar users wherein one of the users includes an anomalous permission.

FIG. 8 is an example of a group of similar users wherein one of the users includes an anomalous permission. The diagram presents a scenario of users (User 1, User 2, User 3, and User 4) from the same development team, wherein one of them (User 4) has different permissions. In the example, all of the users have the same role in a team associated with an enterprise, thus, the users should have the exact same permissions to resources in the cloud. Although, User 4 has extra permissions on a different resource "Production Environment". That is, the present systems and methods can detect any user having permission to any resource which is abnormal, i.e., a resource that the user should not have permission to access. The present systems and methods are adapted to detect such extra permissions that are defined as abnormal/anomalous permissions.

In the present disclosure, a group is referred to one or more users which share common permissions. Various embodiments are adapted to compare these groups, which include identities, to determine if any of the identities/users in these groups have abnormal permissions.

In an embodiment, each group contains users which share the same resource permissions. When groups are compared, whether they contain one or a plurality of users, the systems can identify if one or more users have abnormal permissions. That is, based on a similarity of groups, the systems can determine if one or more users should belong to a different group, i.e., when that anormal permission is removed. In embodiments, when two groups are very similar but not identical, referred to as peers, based on the similarity calculations, the systems can determine that one of the groups includes an abnormal permission. The group that is determined to include the abnormal permission can be the group with the least number of users, the larger number of permissions, etc. The outputs of the present systems and methods include the one or more users determined to have one or more abnormal permissions, and the resource to which this abnormal permission is associated with. For example, User 4 having editing permission to an S3 bucket in a production environment.

The goal is to detect abnormal permissions in groups of accounts with identical permissions on the same resource, which are called peers. The findings are the mutations of one or more accounts with permissions on resources over their peers' permissions. The cloud permissions data for each client can be massive, making the use of a lightweight model which does not utilize large amounts of compute resources to get the abnormal permissions findings a necessity.

Further, in various embodiments, the systems and methods include exporting a peer table, which allows the systems and/or administrators to investigate abnormal group peers over the most similar group which is called the base group. That is, an output of the present systems and methods can include a peer table including the user with an abnormal permission and its peers allowing administrators to investigate and inspect the similar groups. The similar groups being the one or more users determined to have abnormal permissions and the base group, i.e., the peers of the one or more users determined to have abnormal permissions. This allows administrators to investigate and not only see the users with abnormal permissions, but also see their peers and what permissions they have in order to make a decision. The main problem with traditional applications is the requirement to check the similarity between all combinations of accounts with permissions over resources. For example, cloud environments can contain thousands of users with thousands of resources, each of the users having permissions to many of these resources. These processes consume a lot of computation bandwidth to perform the comparison, therefore the present systems and methods dynamically minimize the size of the group when calculating the similarity. The present processes which narrow the size of groups when calculating the similarity significantly improved the model runtime and minimize computation resource usage.

The systems and methods include collecting the necessary data for performing the various calculations and processes described herein. This data can include users and their permissions in a cloud environment, i.e., mapping all permissions to all resources in the environment. This data can be collected through any of the methods described herein and via the cloud-based system 100.

The number of permissions for each user allows the systems to narrow the similarity calculation with an edge overlap for each user group. The window size grows as a log function of the number of permissions of the groups. The window bound starts with lower and higher bounds and increases by the up-rounded natural logarithm of the higher bound. The bounds always overlap with the log of the previous top bound to make sure the systems do not lose in-between window findings. In other words, the systems compare groups within windows, wherein each window size grows as the number of permissions increases. This way, the systems do not waste compute resources for comparing groups which are very distinct and would not be considered peers.

Figure 9:
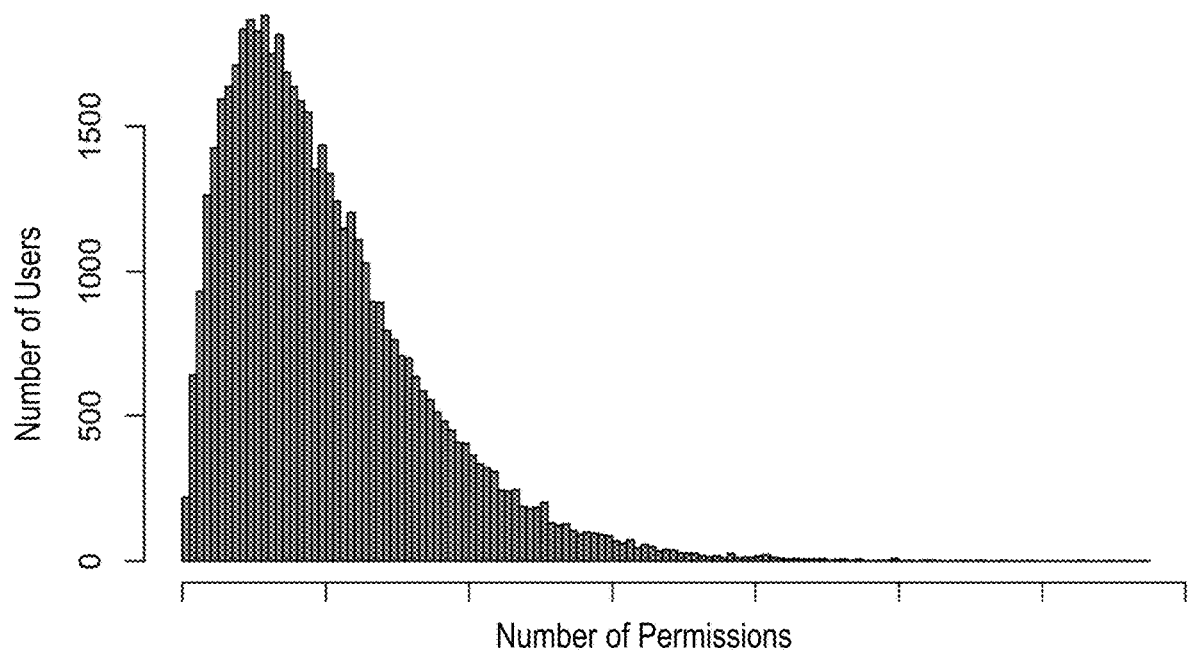
FIG. 9 is a diagram representing a number of permissions for each user or group of users in a cloud environment.

FIG. 9 is a diagram representing a number of permissions for each user or group of users in a cloud environment. Given a right skewed population, such as the one shown in FIG. 9, a constant window size will not separate the windows in an optimal way, thus, a function that is dependent on the number of permissions for each user/group of users is used to optimize the window size in terms of runtime vs memory consumption. Because of the right skewed population, the optimal window interval/size is small close to zero but increases further from zero, that is, the window size grows. The present systems and methods utilize a log based function to get the best results.

In various embodiments, when calculating the abnormal permissions from the data of all the users in an environment, the user permissions vectorization is the memory limit and loop iterations over all users' permissions is the runtime limit. If the memory limit is increased by the number of used cores, the runtime would be reduced, but the machine would be much more expensive. Although, if an optimal window size is found, it would save cost while also being limited to the vectorization memory. To find a balance, for a population with N users that have a right skewed graph by the users number of permissions K, the following must be calculated: $O(N \times N \times K)$.

| Window 1 | |
|---|---|
| Group ID | Permissions |
| g1 | 1 |
| g2 | 2 |

| Window 2 | |
|---|---|
| Group ID | Permissions |
| g2 | 2 |
| g3 | 3 |
| g4 | 4 |

| Window 3 | |
|---|---|
| Group ID | Permissions |
| g4 | 4 |
| g5 | 5 |
| g6 | 6 |
| g7 | 7 |

| Window 4 | |
|---|---|
| Group ID | Permissions |
| g7 | 7 |
| g8 | 8 |
| g9 | 9 |
| g10 | 10 |
| g11 | 11 |

| Window 5 | |
|---|---|
| Group ID | Permissions |
| g10 | 10 |
| g11 | 11 |
| g12 | 12 |
| g13 | 13 |
| g14 | 14 |
| g15 | 15 |
| g16 | 16 |

In this example of windows, each window overlaps with the previous and the next window. For example, in Window 2, Group 4 (g4) and Group 7 (G7) overlap with Window 1 and Window 3 respectively. Further, as can be seen, when the window size grows, the overlap also increases. This can be seen in Window 5, where Group 10 (g10) and Group 11 (g11) both overlap with Window 4. Within each narrow window of groups, the systems look for the most similar but not identical or foreign groups which will indicate a mutation over the most similar group which is called a "base group". Using asymmetrical similarity, for example Twersky similarity or any other asymmetrical similarity methods, the systems calculate for each group (i.e., group of accounts) the asymmetrical similarity of permissions over resource combinations over the base group. The following demonstrates how similarity is determined between groups given the following groups in the window.

| Group ID | Users | Group Accounts | Group Keys | Permissions |
|---|---|---|---|---|
| g1 | 5 | [a1, a2, a3, a10, a11] | (p1#s1, p2#s2, p3#s3) | 3 |
| g2 | 1 | [a4] | (p1#s1, p2#s2, p3#s3, p4#s4) | 4 |
| g3 | 2 | [a5, a8] | (p1#s1, p5#s5, p6#s6) | 3 |
| g4 | 3 | [a6, a7, a9] | (p1#s1, p2#s2, p5#s5, p6#s6) | 4 |

The group keys include information relating to what ability a user has on a specific resource, for example, being an editor, viewer, etc. on an S3 bucket or other resource. The following similarity matrix is then created based on mutual permissions between the various groups.

| Group ID | g1 | g2 | g3 | g4 |
|---|---|---|---|---|
| g1 | 1 | 1 | 0.33 | 0.66 |
| g2 | 0.75 | 1 | 0.25 | 0.5 |
| g3 | 0.33 | 0.33 | 1 | 1 |
| g4 | 0.5 | 0.5 | 0.75 | 1 |

The asymmetrical characteristic of the similarity calculation can be seen here, where the comparison of g1 to g2 produces a similarity score of 0.75, but the comparison of g2 to g1 produces a similarity score of 1. Again, the systems are not looking for identical similarities, but for near identical similarities between groups. The asymmetric similarity between two groups permissions is calculated by the following formula. Here, |g1\g2| denotes the relative complement of g2 in g1. Further, a and B are parameters of the asymmetrical similarity.

$$sim(g1, g2) = \frac{|g1 \cap g2|}{|g1 \cap g2| + \alpha|g1\backslash g2| + \beta|g2\backslash g1|}$$

$$sim(g2, g1) = \frac{|g2 \cap g1|}{|g2 \cap g1| + \alpha|g2\backslash g1| + \beta|g1\backslash g2|}$$

$\alpha$ is not equal to $\beta$, i.e., sim (g1,g2)≠sim (g2,g1) as described above.

In order to calculate similarity in environments which have a large amount of data, i.e., a large number of users, groups, permissions, resources, etc., a lightweight model is used to calculate the similarity between groups using narrow size windows. Within each group, the number of calculations is significantly lower when compared to the total number of the groups. Using the sliding windows to compare the similarity of small groups at each time saves a large amount of memory and runtime. The number of users is dynamic for each client, the bigger the number of users is, the more time it should take to run the model, as a function of the squared size of the number of users. With other approaches of comparing each group to the rest of the groups to look for the maximum similarity but not identical or foreign, the process is not ideal for large clients with large amounts of data, resulting in the following runtime calculation:

N=number of users
K=number of unique permission sets×role
Similarity calculation runtime—O(N×N×K)

After applying the sliding windows and calculating the similarity between only a few groups at each time, the runtime is optimized significantly. The runtime of the similarity calculation with the algorithm optimization is:

M=number of users in each window
S=number of unique permission sets×role in group
W=number of windows
S>>M
Optimized Similarity calculation runtime—O(W×M×M×S)

By utilizing the present systems and methods to optimize permission mutation calculations in cloud environments, the runtime and memory usage of cloud resources can be greatly reduced. Once similarity scores are calculated, a threshold can be used to filter the output. That is, a user or group can be identified as including an abnormal permission based on its similarity score with another group being above this predetermined threshold. This is then exported as a finding of the model which can then be used to perform one or more actions, such as removing an abnormal permission, providing the findings to administrators for further analysis, and the like. Based on the similarity score being above the threshold, the systems can be adapted to identify the differences, i.e., the one or more extra permissions in one of the groups, and automatically remove these permissions. Because each calculation is performed on the various windows and not on an entire data set including all users, permissions, and resources in an environment, the present systems and methods provide a much more efficient way to detect abnormal permissions.

Process for Detecting Abnormal Permissions

Figure 10:
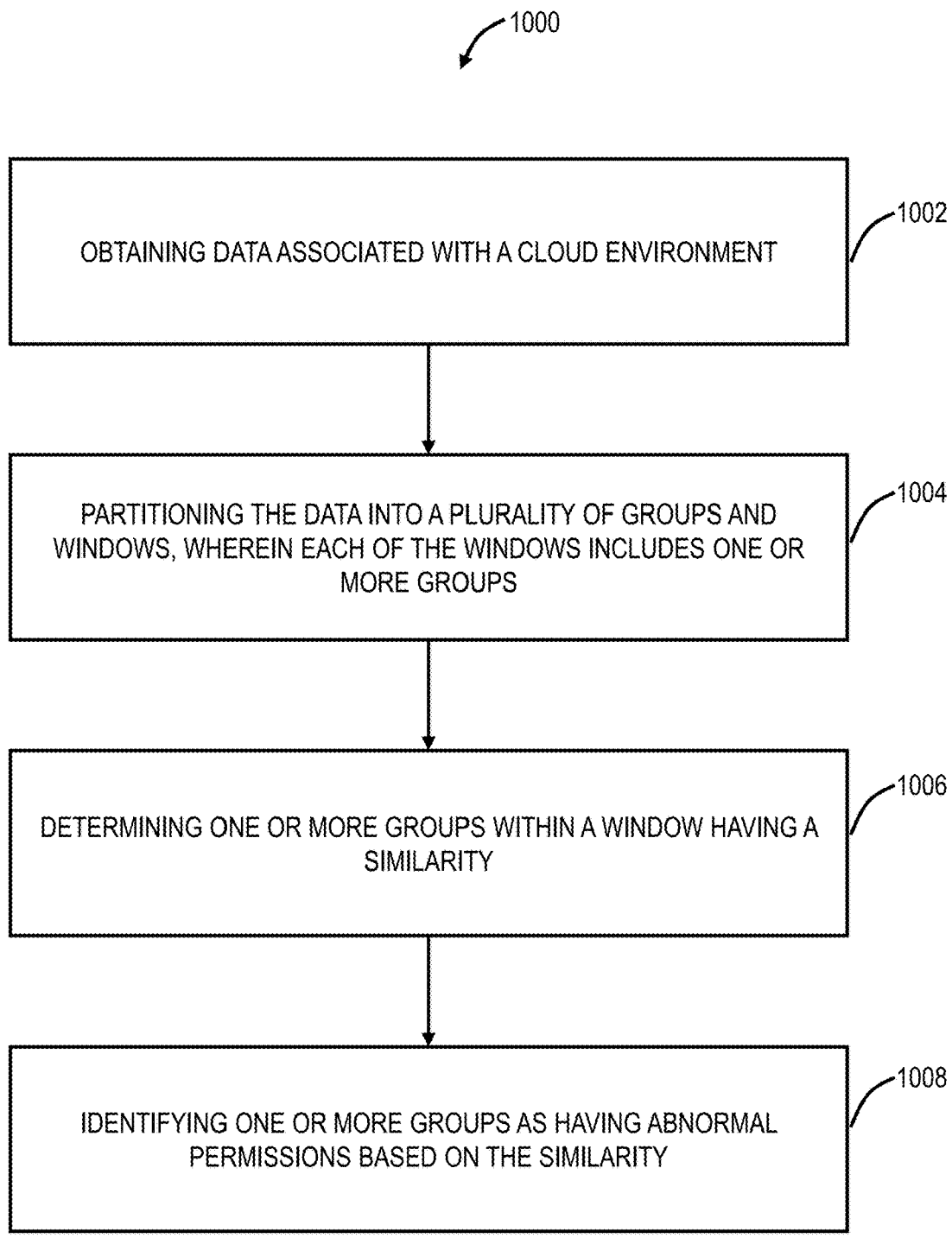
FIG. 10 is a flow chart of a process for detecting abnormal permissions.

FIG. 10 is a flow chart of a process for detecting abnormal permissions. The process 1000 includes obtaining data associated with a cloud environment (step 1002); partitioning the data into a plurality of groups and windows, wherein each of the windows includes one or more groups (step 1004); determining one or more groups within a window having a similarity (step 1006); and identifying one or more groups as having abnormal permissions based on the similarity (step 1008).

The process 1000 can further include wherein the data includes users of the cloud environment, resources in the cloud environment, and permissions of each of the users in relation to the resources in the cloud environment. The partitioning can include partitioning users of the cloud environment into groups and windows based on a number of permissions associated with each user of the cloud environment. Each group can include one or more users, wherein each of the one or more users has one or more permissions to resources in the cloud environment. The determining can include performing a similarity calculation to determine a similarity between groups in a window. The similarity calculation can be an asymmetrical similarity calculation performed between each group associated with a window to produce a similarity score. The identifying one or more users as having abnormal permissions can be based on the similarity score being above a predefined threshold. The steps can further include performing one or more actions based on the identifying. The one or more actions can include any of removing an abnormal permission and providing the one or more groups having abnormal permissions to administrators for further analysis. The providing can further include providing data associated with one or more peer groups of the one or more groups having abnormal permissions to administrators for further analysis.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc., described herein can be used in any and all combinations with each other.

What is claimed is:

1. A method, executed by one or more processors in a cloud-based system, comprising steps of:
   obtaining, by the cloud-based system, data associated with a cloud environment, the data including users of the cloud environment, resources in the cloud environment, and permissions of each of the users in relation to the resource;
   partitioning the data, by the cloud-based system, into a plurality of groups and windows based on a number of permissions associated with each user, wherein each of the windows includes overlapping sets of one or more groups, and wherein a size of each window increases as a logarithmic function of the number of permissions associated with the users in the respective groups;
   determining for each window, by the cloud-based system, one or more groups within a window having a similarity, the similarity determined using an asymmetrical similarity calculation that accounts for extra permissions in one group relative to a peer group;
   identifying one or more groups as having abnormal permissions based on the similarity, wherein the identifying is based on the similarity exceeding a predefined threshold; and
   responsive to identifying the one or more groups as having abnormal permissions, triggering one or more automated actions including removing the abnormal permissions or providing peer group comparison data to an administrator for further analysis.

2. The method of claim 1, wherein the data includes users of the cloud environment, resources in the cloud environment, and permissions of each of the users in relation to the resources in the cloud environment.

3. The method of claim 2, wherein the partitioning includes partitioning users of the cloud environment into groups and windows based on a number of permissions associated with each user of the cloud environment.

4. The method of claim 1, wherein each group includes one or more users, and wherein each of the one or more users has one or more permissions to resources in the cloud environment.

5. The method of claim 4, wherein the determining includes performing a similarity calculation to determine a similarity between groups in a window.

6. The method of claim 5, wherein the similarity calculation is an asymmetrical similarity calculation performed between each group associated with a window to produce a similarity score.

7. The method of claim 6, wherein the identifying one or more users as having abnormal permissions is based on the similarity score being above a predefined threshold.

8. The method of claim 1, wherein the steps further include performing one or more actions based on the identifying.

9. The method of claim 8, wherein the one or more actions include any of removing an abnormal permission and providing the one or more groups having abnormal permissions to administrators for further analysis.

10. The method of claim 9, wherein the providing further includes providing data associated with one or more peer groups of the one or more groups having abnormal permissions to administrators for further analysis.

11. A non-transitory computer-readable medium comprising instructions that, when executed, cause one or more processors in a cloud-based system to perform steps of:

obtaining, by the cloud-based system, data associated with a cloud environment, the data including users of the cloud environment, resources in the cloud environment, and permissions of each of the users in relation to the resource;

partitioning the data, by the cloud-based system, into a plurality of groups and windows based on a number of permissions associated with each user, wherein each of the windows includes overlapping sets of one or more groups, and wherein a size of each window increases as a logarithmic function of the number of permissions associated with the users in the respective groups;

determining for each window, by the cloud-based system, one or more groups within a window having a similarity, the similarity determined using an asymmetrical similarity calculation that accounts for extra permissions in one group relative to a peer group;

identifying one or more groups as having abnormal permissions based on the similarity, wherein the identifying is based on the similarity exceeding a predefined threshold; and responsive to identifying the one or more groups as having abnormal permissions, triggering one or more automated actions including removing the abnormal permissions or providing peer group comparison data to an administrator for further analysis.

12. The non-transitory computer-readable medium of claim 11, wherein the data includes users of the cloud environment, resources in the cloud environment, and permissions of each of the users in relation to the resources in the cloud environment.

13. The non-transitory computer-readable medium of claim 12, wherein the partitioning includes partitioning users of the cloud environment into groups and windows based on a number of permissions associated with each user of the cloud environment.

14. The non-transitory computer-readable medium of claim 11, wherein each group includes one or more users, and wherein each of the one or more users has one or more permissions to resources in the cloud environment.

15. The non-transitory computer-readable medium of claim 14, wherein the determining includes performing a similarity calculation to determine a similarity between groups in a window.

16. The non-transitory computer-readable medium of claim 15, wherein the similarity calculation is an asymmetrical similarity calculation performed between each group associated with a window to produce a similarity score.

17. The non-transitory computer-readable medium of claim 16, wherein the identifying one or more users as having abnormal permissions is based on the similarity score being above a predefined threshold.

18. The non-transitory computer-readable medium of claim 11, wherein the steps further include performing one or more actions based on the identifying.

19. The non-transitory computer-readable medium of claim 18, wherein the one or more actions include any of removing an abnormal permission and providing the one or more groups having abnormal permissions to administrators for further analysis.

20. The non-transitory computer-readable medium of claim 19, wherein the providing further includes providing data associated with one or more peer groups of the one or more groups having abnormal permissions to administrators for further analysis.

\* \* \* \* \*